US008654979B2

(12) United States Patent
Hicks (10) Patent No.: US 8,654,979 B2
(45) Date of Patent: Feb. 18, 2014

(54) QUANTUM KEY DEVICE (75) Inventor: Richard Middleton Hicks, Malvern (GB)

(73) Assignee: Qinetiq Limited, London (GB)

( * ) Notice: Subject to any disclaimer, the term of this patent is extended or adjusted under 35 U.S.C. 154(b) by 168 days.

(21) Appl. No.: 12/993,146

(22) PCT Filed: May 15, 2009

(86) PCT No.: PCT/GB2009/001223
§ 371 (c)(1),
(2), (4) Date: Nov. 17, 2010

(87) PCT Pub. No.: WO2009/141586
PCT Pub. Date: Nov. 26, 2009

(65) Prior Publication Data
US 2011/0085666 A1  Apr. 14, 2011

Related U.S. Application Data (60) Provisional application No. 61/071,805, filed on May 19, 2008.

(30) Foreign Application Priority Data

May 19, 2008  (GB) .................................. 0809038.3

(51) Int. Cl.
*H04L 9/08* (2006.01)
(52) U.S. Cl.
USPC ............................ 380/278; 380/255; 713/171
(58) Field of Classification Search
USPC .................... 380/278, 255; 713/171
See application file for complete search history.

(56) References Cited

U.S. PATENT DOCUMENTS

| | | | |
|---|---|---|---|
| 3,704,996 A | 12/1972 | Borner et al. |
| 4,291,939 A | 9/1981 | Giallorenzi et al. |
| 4,691,984 A | 9/1987 | Thaniyavarn |
| 4,775,971 A | 10/1988 | Bergmann |
| 4,807,952 A | 2/1989 | Jaeger et al. |
| 5,150,436 A | 9/1992 | Jaeger et al. |
| 5,157,754 A | 10/1992 | Bierlein et al. |
| 5,166,991 A | 11/1992 | Jaeger et al. |

(Continued)

FOREIGN PATENT DOCUMENTS

| | | |
|---|---|---|
| EP | 0 583 115 A1 | 2/1994 |
| EP | 0 610 727 A1 | 8/1994 |

(Continued)

OTHER PUBLICATIONS

Office Action dated May 11, 2012 issued in U.S. Appl. No. 12/812,849.

(Continued)

*Primary Examiner* — Shewaye Gelagay
(74) *Attorney, Agent, or Firm* — Oliff PLC (57) ABSTRACT

The present invention relates to an improved quantum key device for use in quantum key distribution, which device comprises a quantum detector unit for detecting a quantum signal and a plurality of logic units operably connected to the quantum detector unit wherein each logic unit is arranged to derive a separate quantum key from the quantum signal detected. In this way, a single quantum key distribution (QKD) receiver can generate separate quantum keys for separate users.

17 Claims, 3 Drawing Sheets

(56) References Cited

U.S. PATENT DOCUMENTS

| | | | |
|---|---|---|---|
| 5,410,625 A | 4/1995 | Jenkins et al. |
| 5,428,698 A | 6/1995 | Jenkins et al. |
| 5,479,514 A | 12/1995 | Klonowski |
| 5,481,636 A | 1/1996 | Fukuda et al. |
| 5,566,257 A | 10/1996 | Jaeger et al. |
| 5,757,912 A | 5/1998 | Blow |
| 5,768,378 A | 6/1998 | Townsend et al. |
| 5,878,142 A | 3/1999 | Caputo et al. |
| 5,999,548 A | 12/1999 | Mori et al. |
| 6,028,935 A | 2/2000 | Rarity et al. |
| 6,145,079 A | 11/2000 | Mitty et al. |
| 6,240,514 B1 | 5/2001 | Inoue et al. |
| 6,717,708 B2 | 4/2004 | Prosyk |
| 6,798,795 B2 | 9/2004 | Yoo |
| 6,806,986 B2 | 10/2004 | Asobe et al. |
| 7,068,790 B1 | 6/2006 | Elliott |
| 7,155,078 B2 * | 12/2006 | Welch et al. ................. 385/14 |
| 7,162,107 B2 | 1/2007 | Bull et al. |
| 7,181,114 B2 | 2/2007 | Lee et al. |
| 7,242,775 B2 | 7/2007 | Vig et al. |
| 7,242,821 B2 | 7/2007 | Bull et al. |
| 7,248,695 B1 | 7/2007 | Beal et al. |
| 7,274,791 B2 | 9/2007 | Van Enk |
| 7,289,688 B2 | 10/2007 | Bull et al. |
| 7,430,295 B1 | 9/2008 | Pearson et al. |
| 7,457,416 B1 | 11/2008 | Elliott |
| 7,460,670 B1 | 12/2008 | Elliott |
| 7,515,716 B1 | 4/2009 | Elliott |
| 7,515,801 B2 | 4/2009 | McCaughan et al. |
| 7,596,318 B2 | 9/2009 | Han et al. |
| 7,627,126 B1 | 12/2009 | Pikalo et al. |
| 7,646,873 B2 | 1/2010 | Lee et al. |
| 7,706,535 B1 | 4/2010 | Pearson et al. |
| 7,760,883 B2 | 7/2010 | Kuang |
| 7,864,958 B2 | 1/2011 | Harrison et al. |
| 7,865,048 B2 | 1/2011 | McCaughan et al. |
| 8,488,790 B2 | 7/2013 | Wellbrock et al. |
| 2002/0025046 A1 | 2/2002 | Lin |
| 2002/0087862 A1 | 7/2002 | Jain et al. |
| 2003/0210912 A1 | 11/2003 | Leuthold et al. |
| 2003/0214991 A1 | 11/2003 | Wiedmann et al. |
| 2004/0032954 A1 | 2/2004 | Bonfrate et al. |
| 2004/0034776 A1 | 2/2004 | Fernando et al. |
| 2004/0109564 A1 | 6/2004 | Cerf et al. |
| 2004/0184603 A1 | 9/2004 | Pearson et al. |
| 2004/0184615 A1 | 9/2004 | Elliott et al. |
| 2004/0252957 A1 | 12/2004 | Schmidt et al. |
| 2005/0078826 A1 | 4/2005 | Takeuchi |
| 2005/0135620 A1 | 6/2005 | Kastella et al. |
| 2005/0190921 A1 | 9/2005 | Schlafer et al. |
| 2005/0249352 A1 * | 11/2005 | Choi et al. ................. 380/286 |
| 2005/0259825 A1 | 11/2005 | Trifonov |
| 2005/0286723 A1 | 12/2005 | Vig et al. |
| 2006/0002563 A1 * | 1/2006 | Bussieres et al. ............. 380/278 |
| 2006/0031828 A1 | 2/2006 | Won et al. |
| 2006/0059343 A1 | 3/2006 | Berzanskis et al. |
| 2006/0062392 A1 | 3/2006 | Lee et al. |
| 2006/0067603 A1 | 3/2006 | Bull et al. |
| 2006/0083379 A1 | 4/2006 | Brookner |
| 2006/0290941 A1 | 12/2006 | Kesler et al. |
| 2007/0014415 A1 | 1/2007 | Harrison et al. |
| 2007/0016534 A1 | 1/2007 | Harrison et al. |
| 2007/0065154 A1 | 3/2007 | Luo et al. |
| 2007/0065155 A1 * | 3/2007 | Luo et al. ................. 398/141 |
| 2007/0071245 A1 | 3/2007 | Kuang |
| 2007/0074277 A1 | 3/2007 | Tofts et al. |
| 2007/0076884 A1 | 4/2007 | Wellbrock et al. |
| 2007/0101410 A1 | 5/2007 | Harrison et al. |
| 2007/0104443 A1 | 5/2007 | Helmy |
| 2007/0122097 A1 | 5/2007 | Schmidt et al. |
| 2007/0123869 A1 | 5/2007 | Chin et al. |
| 2007/0130455 A1 | 6/2007 | Elliott |
| 2007/0133798 A1 * | 6/2007 | Elliott ................. 380/255 |
| 2007/0160201 A1 | 7/2007 | Blom et al. |
| 2007/0177735 A1 | 8/2007 | Mimih et al. |
| 2007/0192598 A1 | 8/2007 | Troxel et al. |
| 2008/0003104 A1 | 1/2008 | Betlach |
| 2008/0013738 A1 * | 1/2008 | Tajima et al. ................. 380/278 |
| 2008/0031456 A1 | 2/2008 | Harrison et al. |
| 2008/0137858 A1 | 6/2008 | Gelfond et al. |
| 2008/0144836 A1 | 6/2008 | Sanders et al. |
| 2008/0147820 A1 | 6/2008 | Maeda et al. |
| 2008/0175385 A1 | 7/2008 | Lee et al. |
| 2008/0292095 A1 | 11/2008 | Vig et al. |
| 2008/0317423 A1 | 12/2008 | Stepanov et al. |
| 2009/0016736 A1 | 1/2009 | Beal et al. |
| 2009/0074192 A1 * | 3/2009 | Beal et al. ................. 380/278 |
| 2009/0106551 A1 | 4/2009 | Boren et al. |
| 2009/0175452 A1 | 7/2009 | Gelfond et al. |
| 2009/0316910 A1 | 12/2009 | Maeda et al. |
| 2010/0098252 A1 | 4/2010 | Kanter et al. |
| 2010/0226659 A1 | 9/2010 | Nishioka et al. |
| 2010/0290626 A1 | 11/2010 | Jenkins et al. |
| 2010/0293380 A1 | 11/2010 | Wiseman et al. |
| 2010/0299526 A1 | 11/2010 | Wiseman |
| 2010/0329459 A1 | 12/2010 | Wiseman et al. |

FOREIGN PATENT DOCUMENTS

| | | |
|---|---|---|
| EP | 1 503 328 A1 | 2/2005 |
| EP | 2 081 317 A2 | 6/2005 |
| EP | 1 605 287 A2 | 12/2005 |
| EP | 1 633 076 A1 | 3/2006 |
| EP | 1 643 663 A1 | 5/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-2005-117511 | 4/2005 |
| JP | A-2005-268958 | 9/2005 |
| JP | A-2007-500370 | 1/2007 |
| JP | A-2007-053591 | 3/2007 |
| JP | A-2007-129562 | 5/2007 |
| WO | WO 92/11550 AI | 7/1992 |
| WO | WO 92/11551 A1 | 7/1992 |
| WO | WO 92/11554 A1 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007-105834 | 9/2007 |
| WO | WO 2007-105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |
| WO | WO 2010/049673 A1 | 5/2010 |

(56) References Cited

FOREIGN PATENT DOCUMENTS

| WO | WO 2010/064003 A1 | 6/2010 |
|---|---|---|
| WO | WO 2010/064004 A1 | 6/2010 |

OTHER PUBLICATIONS

Stucki et al., "Quantum Key Distribution Over 67km With Plug &Play System," New Journal of Physics 4, pp. 41.1-41.8, 2002.
Le et al. "Enhancement of AGT Telecommunication Security using Quantum Cryptography," Ecole Nationale Superieure des Telecommunications, Eurocontrol CARE Project, QCRYPT, France.
U.S. Appl. No. 13/496,324 in the name of Ayling, filed Mar. 15, 2012.
U.S. Appl. No. 13/130,944 in the name of Benton, filed May 24, 2011.
U.S. Appl. No. 13/130,897 in the name of Wiseman, filed May 24, 2011.
U.S. Appl. No. 13/130,790 in the name of Wiseman, filed May 24, 2011.
U.S. Appl. No. 13/125,735 in the name of Wiseman, filed Apr. 22, 2011.
U.S. Appl. No. 12/863,483 in the name of Wiseman, filed Jul. 19, 2010.
U.S. Appl. No. 12/863,509 in the name of Jenkins, filed Jul. 19, 2010.
Sep. 21, 2012 Office Action issued in U.S. Appl. No. 12/812,849.
Jun. 1, 2011 International Search Report issued in Application No. PCT/GB2010/001811.
Jun. 1, 2011 Written Opinion issued in Application No. PCT/GB2010/001811.
Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.
Rass, S., "A Method of Authentication for Quantum Networks," Proceedings of World Academy of Science, Engineering and Technology, vol. 12, (2006), pp. 149-154.
Oct. 4, 2012 Office Action issued in U.S. Appl. No. 12/992,695.
Nov. 8, 2012 Office Action issued in U.S. Appl. No. 12/863,510.
Nov. 9, 2012 Office Action issued in U.S. Appl. No. 13/130,790.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Kanamori et al., "3 Party Quantum Authenticated Key Distribution with Partially Trusted Third Party," IEEE Communications Society, 2008, Globecom 2008 Proceedings.
Bechmann-Pasquinucci et al., "Quantum key distribution with trusted quantum relay," May 12, 2005, pp. 1-13, <http://arxiv.org/PS_cache/quant-ph/pdf/0505/0505089v1.pdf>.
Bennett et al., "Quantum Cryptography: Public Key Distribution and Coin Tossing," International Conference on Computers, Systems & Signal Processing, Dec. 10-12, 1984, pp. 1-5, Bangalore, India.
Duligall et al., "Low cost and compact quantum key distribution," New Journal of Physics 8, 249, pp. 116, 2006.
Elliott, "Building the quantum network," New Journal of Physics 4, pp. 46.1-46.12, 2002, XP-002271991.
Fernandez et al., "Gigahertz Clocked Quantum Key Distribution in Passive Optical Networks," Leos Summer Topical Meetings, 2006 Digest of the Quebec City, Canada, Jul. 17, 2006, pp. 36-37, XP-010940123.
Fernandez et al., "Passive Optical Network Approach to GigahertzClocked Multiuser Quantum Key Distribution," Journal of Quantum Electronics, vol. 43, No. 2, pp. 130-138, Feb. 2007.
Brassard et al., "Multi-User Quantum Key Distribution Using Wavelength Division Multiplexing," pp. 1-5, XP-002534322, <http://citeseerx.ist.psu.edu/viewdoc/download?doi=10.1.1.87.378&rep=rep1&type=pdf>, 2003.
Gordeev et al., "Tunable electro-optic polarization modulator for quantum key distribution applicators,"Optics Communications, vol. 234, pp. 203-210, 2004.
Horikiri et al., "Quantum key distribution with a heralded single photon source," International Quantum Electronics Conference, 2005, pp. 1617-1618, Jul. 11, 2005.
Lee et al., "Quantum Authentication and Quantum Key Distribution Protocol," Jan. 11, 2006,pp. 1-8, <http://arxiv.org/PS_cache/quant-ph/pdf/0510/0510144v2.pdf>.
Rao et al., "Nonlinear frequency conversion in semiconductor optical waveguides using birefringent, modal and quasiphase-matching techniques," Journal of Optics A: Pure and Applied Optics, vol. 6, pp. 569-584, 2004.
Karlsson et al., "Authority-based user authentication in quantum key distribution," Physical Review A, vol. 62, pp. 022305-1-022305-7, 2000, XP-002534291.
Kuhn, "A Quantum Cryptographic Protocal with Detection of Compromised Server," Quantum Information and Computation, vol. 5, No. 7, pp. 551-560, 2005, XP-002520284.
Kumavor et al., "Comparison of Four Multi-User Quantum Key Distribution Schemes Over Passive Optical Networks," Journal of Lightwave Technology, vol. 23, No. 1, pp. 268-276, Jan. 2005, XP-001227328.
Malis et al., "Improvement of second-harmonic generation in quantum-cascade lasers with true phase matching," Applied Physics Letters, vol. 84, No. 15, pp. 2721-2723, Apr. 12, 2004.
Mašamović et al., "Design and Performance of a Monolithically Integrated Widely Tunable All-Optical Wavelength Converter With Independent Phase Control," IEEE Photonics Technology Letters, vol. 196, No. 10, pp. 22992301, Oct. 2004.
Menezes, Handbook of Applied Cryptography, Chapter B Key Management Techniques, CRC Press LLC, pp. 547-553, 1997, XP-002520285.
Nambu et al., "BB84 Quantum Key Distribution System based on Silica-Based Planar Lightwave Circuits," Apr. 22, 2008, pp. 1-11, <http://arxiv.org/PS_cache/quant-ph/pdf/0404/0404015.pdf>.
Hwang et al., "Provably Secure Three-Party Authenticated Quantum Key Distribution Protocols," IEEE Transactions on Dependable and Secure Computing, vol. 4, No. 1, pp. 71-80, Jan.-Mar. 2007.
Mo et al., "Quantum key distribution network with wavelength addressing," Oct. 15, 2006, pp. 1-11, <http://arxiv.org/PS_cache/quant-ph/pdf/0610/0610096v2.pdf>, XP-002534290.
Nguyen et al., "802.11i Encryption Key Distribution Using Quantum Cryptography," Journal of Networks, vol. 1, No. 5, pp. 9-20, Sep./Oct. 2006, XP-002576733.
Moutzouris et al., "Second Harmonic Generation in GaAs/AlGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.
Jäger et al., "Modal dispersion phase matching over 7 mm length in overdamped polymeric channel waveguides," Applied Physics Letters, vol. 69, No. 27, pp. 4139-4141, Dec. 30, 1996.
Yin et al., "Integrated ARROW waveguides with hollow cores," Optics Express, vol. 12, No. 12, pp. 270-2715, Jun. 14, 2004, XP-002363659.
Yariv, "Coupled-Mode Theory for Guided-Wave Optics," IEEE Journal of Quantum Electronics, vol. QE-9, No. 9, pp. 919-933, Sep. 1973.
Rahmatian, "An Ultrahigh-Speed AlGaAs—GaAs Polarization Converter Using Slow-Wave Coplanar Electrodes," IEEE Photonics.
Finlayson et al., "Polarization Conversion in Passive DeepEtched GaAs/AlGaAs Waveguides," Journal of Lightwave Technology, vol. 24, No. 3, pp. 1425-1432, Mar. 2006, XP-002459136.
Grossard et al., "AlGaAs—GaAs Polarization Converter with Electrooptic Phase Mismatch Control," IEEE Photonics Technology Letters, vol. 13, No. 8, pp. 830-832, Aug. 2001.

(56) References Cited

OTHER PUBLICATIONS

Hall et al., "Optical Guiding and Electro-Optic Modulation in GaAs Epitaxial Layers," Optics Communications, vol. 1, No. 9, pp. 403-405, Apr. 1970.
Haxha et al., "Analysis of polarization conversion in AlGaAs/GaAs electrooptic polarization converter," Optics Communications, vol. 262, pp. 47-56, 2006, XP-002459135.
Heaton et al., "Optimization of Deep-Etched, Single-Mode GaAs/AlGaAs Optical Waveguides Using Controlled Leakage into the Substrate," Journal of Lightwave Technology, vol. 17, No. 2, pp. 267-281, Feb. 1999.
Izuhara et al., "Low-voltage tunable TE/TM converter on ion-sliced lithium niobate thin film," Electronic Letters, vol. 39, No. 15, Jul. 24, 2003.
Schlak et al., "Tunable TE/TM-Mode Converter on (001)-InP-Substrate," IEEE Photonics Technology Letters, vol. 3, No. 1, pp. 15-16, Jan. 1991.
Wang et al., "High Speed III-V Electooptic Waveguide Modulators at $\lambda = 1.3$ µm," Journal of Lightwave Technology, vol. 6, No. 6, pp. 758-771, Jun. 1988.
Mar. 31, 2009 International Search Report issued in Application No. PCT/GB2009/000190.
Mar. 31, 2009 Written Opinion issued in Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion issued in Application No. PCT/GB2009/000189.
Aug. 3, 2010 International Preliminary Report on Patentability issued in Application No. PCT/GB2009/000179.
Jun. 2, 2009 International Search Report issued in Application No. PCT/GB2009/000179.
Jun. 2, 2009 Written Opinion issued in Application No. PCT/GB2009/000179.
Apr. 24, 2008 British Search Report issued in Application No. GB0801492.0.
Jul. 28, 2009 International Search Report issued in Application No. PCT/GB2009/000186.
Jul. 28, 2009 Written Opinion issued in Application No. PCT/GB2009/000186.
May 21, 2008 British Search Report issued in Application No. GB0801395.5.
Jul. 14, 2009 Written Opinion issued in Application No. PCT/GB2009/001223.
Jul. 14, 2009 International Search Report issued in Application No. PCT/GB2009/001226.
Jul. 14, 2009 Written Opinion issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
U.S. Appl. No. 12/993,098, filed Nov. 17, 2010; Wiseman et al.
U.S. Appl. No. 12/992,695, filed Nov. 15, 2010; Wiseman.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Nov. 16, 2012 Office Action issued in U.S. Appl. No. 13/130,897.
Jan. 3, 2013 Office Action issued in U.S. Appl. No. 13/125,735.
Jan. 18, 2013 Office Action issued in U.S. Appl. No. 12/993,098.
Feb. 11, 2013 Notice of Allowance issued in U.S. Appl. No. 12/863,483.
Mar. 13, 2013 Office Action issued in U.S. Appl. No. 12/992,695.
Apr. 11, 2013 Office Action issued in U.S. Appl. No. 13/130,944.
May 10, 2013 Office Action issued in U.S. Appl. No. 13/130,897.
Le et al. "Enhancement of AGT Telecommunication Security using Quantum Cryptography," Ecole Nationale Superieure des Telecommunications, Eurocontrol CARE Project, QCRYPT, France, 2006.
Lütkenhaus, "Estimates for Practical Quantum Cryptography," Helsinki Institute of Physics, Feb. 1, 2008, pp. 1-26, Helsinki, Finland.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Jan. 23, 2009 Search Report issued in International Application No. GB0819665.1.
Mar. 18, 2009 Search Report issued in International Application No. GB0822356.2.
Mar. 16, 2009 Search Report issued in International Application No. GB0822254.9.
Mar. 16, 2009 Search Report issued in International Application No. GB0822253.1.
Jan. 25, 2010 Search Report issued in International Application No. GB0917060.6.
Jun. 29, 2010 Search Report issued in International Application No. GB0917060.6.
Mar. 25, 2010 Search Report and Written Opinion issued in International Application No. PCT/GB2009/002543.
Jan. 4, 2010 Search Report and Written Opinion issued in International Application No. PCT/GB2009/002745.
Sep. 30, 2010 Search Report and Written Opinion issued in international Application No. PCT/GB2009/002802.
Apr. 20, 2010 Search Report and Written Opinion issued in International Application No. PCT/GB2009/002801.
May 31, 2012 Search Report and Written Opinion issued in International Application No. PCT/GB2011/001670.
Aug. 1, 2012 Office Action issued in U.S. Appl. No. 12/993,098.
Aug. 15, 2012 Office Action issued in U.S. Appl. No. 12/863,483.
Sep. 12, 2012 Office Action issued in U.S. Appl. No. 12/863,509.
Jun. 21, 2012 Office Action issued in U.S. Appl. No. 12/863,510.
U.S. Appl. No. 13/496,324, in the name of Ayling, filed Mar. 15, 2012.
U.S. Appl. No. 13/130,944, in the name of Benton, filed May 24, 2011.
U.S. Appl. No. 13/130,897, in the name of Wiseman, filed May 24, 2011.
Apr. 30, 2013 Office Action issued in Japanese Application No. 2010-543567 (English Translation Only).
Aug. 29, 2013 Office Action issued in U.S. Appl. No. 12/992,695.
Sep. 12, 2013 Office Action issued in U.S. Appl. No. 13/130,897.
Sep. 18, 2013 Office Action issued in U.S. Appl. No. 12/812,849.
Ibrahim et al., "Simulation of Static Optical XPM in Active MMI Couplers," (published in International Conference on Numerical Simulation of Optoelectronic Devices, Sep. 2007), pp. 95-96.
Jul. 3, 2013 Office Action issued in U.S. Appl. No. 12/993,098.
Jun. 28, 2013 Office Action issued in U.S. Appl. No. 13/130,790.
Jun. 11, 2013 Office Action issued in U.S. Appl. No. 12/863,509.
Jul. 8, 2013 Office Action issued in U.S. Appl. No. 13/496,324.
Nov. 5, 2013 Office Action issued in U.S. Appl. No. 12/863,510.
Nov. 7, 2013 Office Action issued in U.S. Appl. No. 12/993,098.
Ma et al, Experimental Demonstration of an Active Quantum Key Distribution Network with Over Gbps Clock Synchronization (published in IEEE Communications Letters, vol. 11, No. 12, Dec. 2007).

* cited by examiner

Prior Art

QUANTUM KEY DEVICE

FIELD OF THE INVENTION

This invention relates to an improved quantum receiver for use in quantum key distribution.

BACKGROUND OF THE INVENTION

Quantum key distribution (QKD) is a well known technique which offers the possibility of secure distribution/generation of cryptographic keys for use in encryption. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution.

Bennett and Brassard described a QKD protocol in C. H. Bennett and G. Brassard, "Quantum cryptography: 'Public key distribution and coin tossing'," IEE Conf. Computers Systems Signal Processing, Bangalore, India 1984 which has become known as the BB84 protocol. This protocol uses the transmission of a suitably encoded series of single photons (a quantum exchange) followed by an open discussion via any conventional communication medium (a key agreement stage) to allow Alice and Bob to derive a shared string of random numbers. As single photons are used in the quantum exchange the only way Eve can gain any information about this exchange is to intercept the single photons sent by Alice and measure the information herself. To avoid detection she should also transmit a photon to Bob which attempts to replicate the original photon she intercepted. Due to the random choice of encoding and the quantum nature of the photons Eve can not guarantee to pass a correctly encoded photon to Bob and this will generate a statistical error which will be spotted by Alice and Bob during their conventional communication.

QKD therefore offers a secure means of distributing new key material which protects against eavesdropping.

QKD can also be applied to optical communication networks. British Telecom patent U.S. Pat. No. 5,768,378 teaches that QKD may also be used to distribute keys between a single sender (Alice) and multiple receivers (Bobs) via a passive optical network. Light sent downstream from the Alice end encounters one or more passive optical network switches which distribute the light between their outputs. In terms of sending single photons for QKD each photon traverses one of the downstream paths at random and ends up at one particular Bob. Each Bob can then agree a separate key with Alice. Subsequent message traffic intended for a particular Bob can then be encrypted with the relevant key and sent over the passive optical network. Although all Bobs receive the message traffic only the user at the relevant Bob has the correct key and can thus decrypt the message.

As described above each endpoint requiring a separate key requires a Bob unit, i.e. a quantum receiver. Quantum receivers capable of detecting accurately single photon signals generally require sophisticated cooled detectors and good quality optics.

SUMMARY OF THE INVENTION

It is an object of the present invention therefore to provide a single QKD receiver that can generate separate keys for separate users.

Thus according to a first aspect of the present invention there is provided a quantum key device comprising a quantum detector unit for detecting a quantum signal and a plurality of logic units operably connected to the quantum detector unit wherein each logic unit is arranged to derive a separate quantum key from the quantum signal detected.

As used in the present specification the term quantum key device means a device which is capable of deriving some shared secret data, referred to herein as a quantum key, with another quantum key device based on a quantum signal exchanged between them. A quantum signal is any signal which may be used as the basis of a quantum key agreement protocol as would be understood by one skilled in the art. For instance the quantum signal may comprise a series of suitably modulated single photons. The skilled person will be well aware of various modulation schemes which may be used, for instance phase modulation or polarisation modulation.

The quantum key device of the present invention comprises a quantum detector unit for receiving the quantum signal transmitted by a quantum key device having a quantum transmitter. A device which receive the quantum signal in QKD is commonly referred to as a Bob—with the transmitting device referred to as an Alice. Unlike prior art Bob devices however the device of the present invention has one quantum detector unit arranged with multiple logic units to derive a plurality of separate quantum keys, i.e. keys that are different to each other and which are not known by the other logic units. In other words the devices acts like a plurality of separate Bob devices but with only one quantum detector unit—hence only one set of quantum detectors, optics etc.

Quantum detectors such as single photon detectors are relatively expensive and complex items that require cooling and therefore have relatively high power requirements. Similarly other optical components used in the quantum detector unit may be expensive and bulky. Therefore effectively sharing the detector unit between multiple logic units to generate a plurality of separate quantum keys offers significant cost, power and space saving compared to having a separate individual Bob to generate each quantum key. This is particularly the case in an environment which requires several different encryption keys for different channels in the same location, for instance for different classification channels. For example imagine a workspace with a telephone, a computer for low classification operation connected to a network and a computer for high classification operation connected to a network. Previously if all three channels (the voice channel and the low classification data channel and the high classification data channel) were to be encrypted using keys derived by QKD there would be a need for three separate Bob devices. Even leaving aside the cost implications of three separate Bob devices, as mentioned above the Bob devices can be relatively bulky. Clearly were more channels required to be secured by QKD, for instance further data channels of different classification, voice channels of different classification, video channels etc. the requirement for the number of Bob devices would likewise increase. The present invention avoids the need for multiple distinct Bobs and uses a single quantum detector unit with as many logic units as required.

There is a further advantage in that if one Alice is transmitting to multiple different locations using existing technology an optical splitter is required and this will reduce the maximum possible fan out. Equally, if the losses between the Bob and the Alice equipment are too large, it may not be possible to insert a splitter and maintain the required error rates. The present invention overcomes both these problems.

It should be noted that the first aspect of the present invention is different to a single Bob, i.e. a device with a quantum detector unit and a single set of control logic unit, that may be arranged to generate a plurality of quantum keys and then communicate a different one of said quantum keys to each different user. In this arrangement it is the same control logic unit that runs the key agreement protocol with Alice and thus the control logic unit knows effectively all of the quantum keys generated. Security between different users would rely on the Bob providing the correct key to the correct user and not providing the same key to different users.

The present invention however uses separate control logic units to run the key agreement protocol for each separate quantum key and thus each logic unit only knows the key which it derives. If each logic unit controls the quantum key agreement for a separate user there is limited chance of a key ending up being used for the wrong user.

Note as used herein the term user is taken to mean a user of one of the quantum keys. Thus if an individual has two desktop computers and each requires a separate quantum key then each separate computer (and the individual when using that computer) is considered a separate user. A single computer may also be partitioned to run at two or more different classification levels and each partition represents a user. As will be described however the user may not actually receive the relevant quantum key itself but it may be used on behalf of that user by a crypto-unit located on that user's communication channel.

Conveniently the quantum key device is arranged so that no significant signals pass from the logic units to the quantum detector unit, in other words so that there is a one way flow of information: from the quantum detector unit to the logic units. The device of the present invention may comprise a means for preventing a signal passing from a logic unit to the quantum detector unit. Various means for allowing one way signal flow are known. For instance the signal transfer could be optical for at least part of the path from the quantum detector unit to the logic units with no optical detector on the quantum detector unit side. Various data diodes, i.e. devices allowing one way data flow, are known and could be used.

The logic units may also be shielded from one another to prevent any emissions or cross-talk between the logic units. The logic units may, in some applications be physically separate units. However the logic units could be implemented as separate logical processors within the same processor chip or chip set.

The quantum detector unit detects the quantum signal received by the quantum key device and attempts to determine data values from the quantum signal as is known in QKD. Various arrangements of quantum detector units are known in the art and could be used in the device of the present invention. As mentioned above the quantum detector unit comprises one or more quantum signal detectors, such as single photon detectors. It may comprise optical components for guiding the quantum signal to an appropriate quantum detector. It may also comprise a means of applying a measurement basis to incident photons such as a polarisation modulator or interferometer.

The quantum detector unit may further comprise a controller for clock timing, synchronisation, calibration etc. The controller may also control the means of applying a measurement basis to the quantum signal.

The output of the quantum detector unit, which may be the transmitted by the controller, corresponds to the detected quantum signal and may, for instance, comprise for each photon detected the measurement basis applied and resulting data value.

The device of the present invention may be arranged such that each logic unit receives only part of the output of the quantum detector unit. This would ensure each logic unit, in effect, uses a unique part of the quantum signal detected by the quantum detector unit. The device may therefore include a switch which switches the output of the quantum detector unit between the logic units. The output from the quantum detector unit may be optical or may be converted to the optical domain for at least part of the path to the logic units and the switch may be an optical switch.

Alternatively the output of the quantum detector unit may be passed to each logic unit but each logic unit arranged to use only part of the output in performing key agreement, for instance through time division of logic units. This embodiment does require trust that the logic units do not use the same parts of the output signal from the quantum detector unit but this can be arranged relatively easily through appropriate programming of the logic units and/or clocking.

Each logic unit is connected to a classical communication device for communicating with the Alice device that transmitted the control signal. A classical communication device may be provided for each logic unit or one classical communication device may be shared between some or all of the logic units. Each logic unit will perform the usual steps involved in QKD according to whatever protocol is being followed. Typically these steps involve sifting, error checking/correction, privacy amplification and authentication. As far as this part of the QKD process is performed each logic unit acts as an independent Bob which received part of the transmitted quantum signal. Alice and each logic unit will perform mutual authentication to ensure that they are not talking to an eavesdropper and the authentication will allow Alice to know which quantum key is agreed with which logic unit—just as if they were truly independent Bobs.

The quantum key agreed between a control unit and Alice is typically passed to a crypto-unit. The term crypto-unit as used herein means a device for encrypting communications and transmitting the encrypted communication via any conventional means and/or receiving encrypted communications and decrypting them using a cryptographic key, in this case the quantum key. The crypto-unit is arranged on the classical communication channel to/from the user such that data sent in the clear from the user is encrypted in by the crypto-unit using the quantum key and transmitted onward and encrypted data received is decrypted by the crypto-unit before being transmitted to the user. The crypto-unit is preferably co-located with the logic unit, i.e. the quantum key device according to the present invention comprises a separate crypto-unit associated with each logic unit but it would be possible to have the crypto-units in a separate location and in communication with the quantum key device of the present invention.

On the Alice side of the quantum key device of the present invention there will be at least one quantum input channel for receiving the quantum signal and at least one classical input/output. The quantum channel could comprises a free space link or a link through one or more suitable waveguides. Conveniently the quantum channel comprises a link via fibre optic cable and for the avoidance of doubt as used herein the term waveguide shall be taken to include fibre optics. The classical communication channel may comprises any means of classical communications such as electrical, optical or wireless rf. Conveniently however the classical communication is also via fibre optic cable and the classical and quantum signals are wavelength division multiplexed. Thus the Alice side of the device may have a single fibre optic connection. The classical communications of the logic units with the Alice side may be wavelength division multiplexed or time division multiplexed as may be the encrypted communications to/from the various users.

On the user side of the device there will be a separate classical channel for each user. Conveniently this may be electrical or optical but as the data on the user side is plaintext (at least when the quantum key device does comprise the crypto-units) there is typically a need to ensure no cross-talk or data leakage.

It is also therefore important to ensure that the connections between the various users and the quantum key device are made correctly. The authentication between Alice and a particular logic unit confirms to Alice that she is agreeing a key with a particular user. This of course only applies if the connections are correct. Incorrect connection of a user could occur on installation of the system but also, where for instance different users comprise desktop computers with removable hard drives, the user will be defined by the hard drive rather than the rest of the machine.

The problem of incorrect connection could be reduced by using physically different connections for different users so that the fibre optic for user X will only fit into the slot in the quantum key device meant for user X. However this is burdensome and costly.

An alternative method would be to store all or part of the identity key used for authentication in the user device and not in the quantum key device. Thus when a particular logic unit was attempting to agree a new key with Alice and needed to authenticate, the logic unit would obtain the identity key of the current user on that connection. This would mean that when a new quantum key was agreed with a control unit the relevant user would be identified. Even if the connections were later switched so that a different user where then connected, provided a new key was agreed before any message traffic, the agreement of the new key would be based on the identity key of the new user and hence messages intended for the right user would be encrypted using that key. This arrangement typically requires monitoring of any disconnects on the user side of the device and agreement of a new key on reconnection. As an alternative the Bob hardware could for example poll the end user device are frequently re-authenticate.

Alternatively the logic unit and user could effectively authenticate to ensure that the system only operates when connected correctly. The authentication could be mutual or one way (in either direction) but conveniently the user device may be arranged such that on any new connection to the quantum key device—which could be boot up of a computer—the user device sends or receives a token and only if the token is correct is communication via the appropriate port allowed.

The use of separate logic units to derive separate keys as described in the first aspect of the invention offers high security but without the need for multiple quantum receivers. In general however the invention relates to a device having a single quantum receiver deriving a separate quantum key for each of a plurality of users connected to the device.

In another aspect of the present invention there is provided a quantum detector unit for detecting a quantum signal being arranged to derive a separate quantum key for each of a plurality of users from the quantum signal detected. Conveniently the quantum detector unit comprises a plurality of logic units as described above. However in one embodiment there may be at least one logic unit operably connected to a plurality of logically separate crypto-units wherein said logic unit is arranged to derive a separate quantum key for each of said crypto-units. In this embodiment a single logic unit derives several different keys. Each key is delivered to a logically separate crypto-unit, each crypto-unit acting on a channel to a different user. In this way each user is provided with their own quantum key. This arrangement has the advantage that only one authentication token is required. The logic unit will clearly know all the keys generated and therefore must be arranged to use the keys correctly and deliver the correct key to the correct crypto unit. This could be achieved using conventional cryptographic engineering. The QKD network would need to be in a security domain that was at least as secure as all of the others put together or in more formal language in a security domain that dominates all the other security domains. Many skilled persons might suggest that good practice would be to put it into a security domain above all the others.

BRIEF DESCRIPTION OF THE DRAWING

The invention will now be described by way of example only with respect to the following drawings, of which.

DETAIL DESCRIPTION OF THE DRAWING

Figure 1:
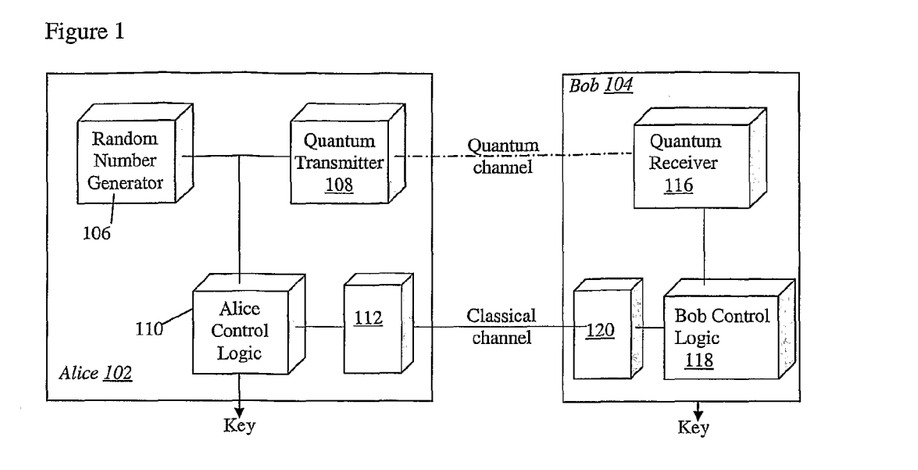
FIG. 1 shows a schematic of a standard QKD transmitter (Alice) and receiver (Bob) arranged over a single optical link.

Referring to FIG. 1 the basic structure of a standard QKD system is shown. The quantum transmitter 102, typically referred to as Alice, is optically linked to the quantum receiver 104, typically referred to a Bob. The optical link may be through free space or any suitable waveguide such as a fibre-optic path. For illustration the link will be described herein as being a fibre optic link. A typical Alice unit compromises a random number generator 106, quantum transmitter 108, controlling logic 110 and classical transceiver 112. The quantum transmitter 108 produces a series of single photons, each photon being randomly encoded using a value produced by the random number generator. The skilled person will readily appreciate that there are a number of different known encoding protocols and a number of suitable transmitters which could be used for QKD and hence these aspects will not be described further. For the purposes of this description a BB84 type protocol will be assumed wherein one of two encoding bases is chosen at random for each photon and the photon is randomly encoded with a data value of 1 or 0 in the chosen encoding base. The data regarding the applied encoding base and data value for each photon is passed to the Alice control logic 110.

The series of encoded single photons are transmitted through the fibre optic to the Bob unit 104. A typical Bob unit comprises a quantum receiver 116 which randomly chooses an encoding base with which to measure the photon and then determines a data value for the photon in the chosen base. The output of the quantum receiver 116, which indicates the applied encoding base and measured value for each detected photon is passed to Bob control logic 118.

Alice control logic 110 and Bob control logic 118 then communicate with each other via classical transceivers 112 and 120 respectively to establish a common shared key as is well known. Note as used herein the term logic means any suitable device arrangement for performing the key agreement protocols. The control logic may be a suitable designed ASIC or a suitably programmed FPGA. The control logic could also be a suitably programmed microprocessor.

In establishing a common shared key, Alice control logic 110 and Bob control logic 118 mutually authenticate each other in order to exclude the possibility of a man-in-the-middle attack. Such authentication is a well known procedure and may, for example, involve the two parties applying digital signatures to the messages they exchange. The digital signatures are generated and validated by means of a cryptographic key referred to as the identity key for the link. This may be based on symmetric cryptographic techniques in which case the identity key is a secret value known only to both parties. Alternatively, the authentication information may merely be a shared secret between the Alice equipment and the Bob equipment or a shared secret between the Alice equipment and a combination of one or more of the end user, the end-user's equipment, a token held by the end user and biometric information that identifies the user.

Having used QKD to establish a new common shared key value, and mutually authenticated each other, Alice control logic 110 and Bob control logic 118 can use that value in part to update the secret identity key and in part as an encryption key for protecting subsequent communication between them. On any given occasion, the Alice and Bob logic could elect to use the all of the value to update the secret identity key or all or part of it as an encryption key or as a one time pad key. The encryption key is passed to a suitable crypto-unit (not shown) for encrypting plaintext message traffic and decrypting encrypted message traffic sent on the classical communication channel.

Figure 2:
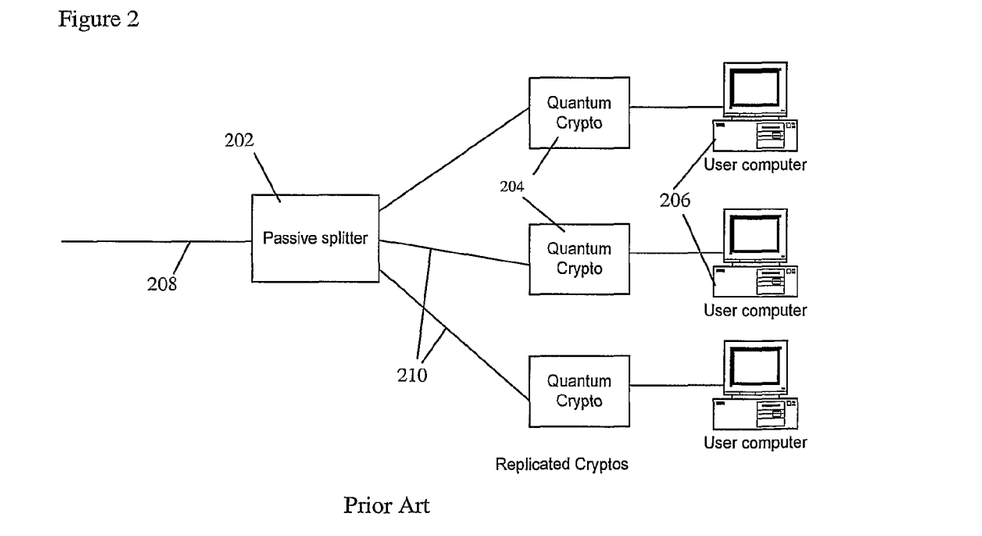
FIG. 2 illustrates the arrangement of multiple users according to the prior art.

FIG. 2 illustrates how QKD may be applied over a passive optical network with multiple user computers 206. An Alice unit, not shown, is arranged to communicate with the user computers 206. A common fibre optic cable 208 carries downstream signals from Alice to a passive splitter 202, i.e. a passive optical network switch, which distributes the incoming optical signals to the fibres 210 which link to a quantum crypto-unit 204 for each user computer 206. The quantum crypto-unit is a Bob device 104 as described above together with a crypto-unit acting on the classical channel. Each quantum crypto-unit receives part of a quantum signal transmitted by Alice, agrees a quantum key with Alice and then uses that quantum key to encrypt/decrypt message traffic to/from the relevant user computer. Message traffic intended for a particular user computer will be received by all the quantum crypto-units but as it will be encrypted with the relevant quantum key and it can only be decrypted by the quantum crypto-unit for the relevant user computer.

This arrangement provides good security but requires each user computer to have its own Bob unit with its own quantum receiver.

Figure 3:
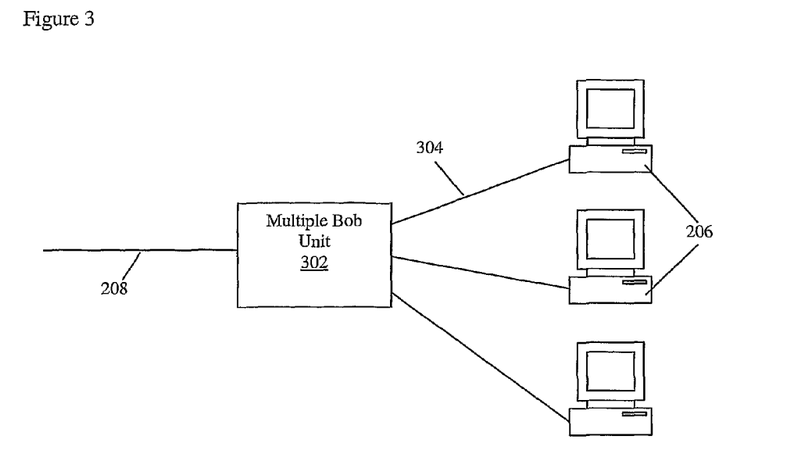
FIG. 3 illustrates the principles of the present invention.

FIG. 3 illustrates the arrangement according to the present invention where like components are designated using like numerals. A single multiple Bob device 302 is directly connected to the optic fibre cable 208 link to Alice. As before this fibre optic carries classical communications and the single photon quantum signal with wavelength division multiplexing. The multiple Bob device also has a direct connection with each user computer 206. These links may be electrical or optical. The multiple Bob device is described in more detail below with reference to FIG. 4.

Figure 4:
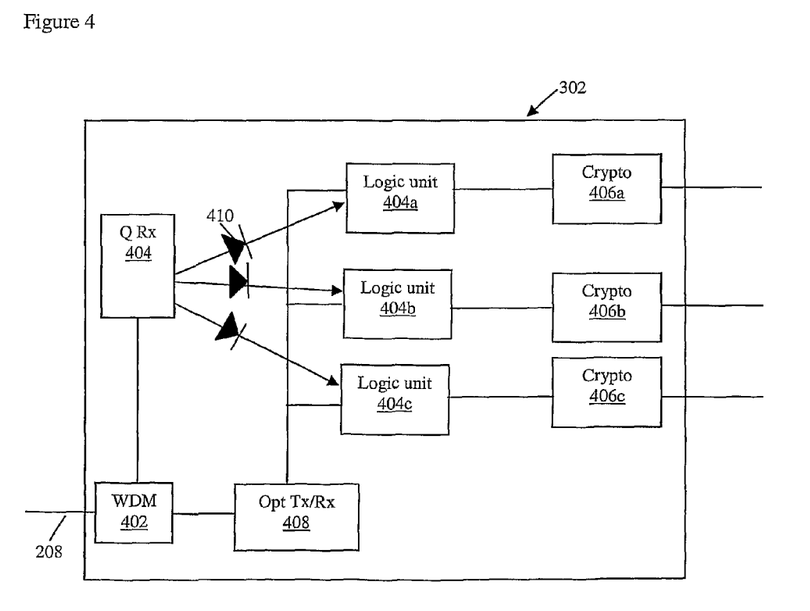
FIG. 4 shows one embodiment of a device according to the present invention.

The multiple Bob device 302 has an interface (not shown) to input fibre optic cable 208. Incoming optical signals are received by wavelength division demultiplexer 402 which directs signal received at the wavelength of the quantum signal to the quantum receiver optics 404. Signals at a classical communications frequency are directed to optical transmitter/receiver 408.

The quantum receiver optics 402 applies a measurement basis to each received photon and attempts to determine the data value of the photon according to that basis. The quantum receiver produces an output indicative of the measurement basis applied and resulting data value. This output is transmitted to each logic unit 404a-c via a data diode arrangement 410 which ensure that information can only flow one way from the quantum receiver 404 to the logic units. Each logic unit 404a-c is separated in information terms from the other logic units. Each logic unit then communicates with Alice, via the optical transmitter/receiver 404, to establish a respective quantum key. As the classical communication is effectively conducted in the clear the logic units can share the optical/transmitter receiver—provided that they are designed to avoid unwanted data leakage along common connections.

Once a logic unit establishes a quantum key it is loaded into the relevant crypto-unit 406a-c. The output of each crypto-unit is connected to an appropriate user computer 206.

Message traffic from a particular user is therefore sent in the clear to the appropriate crypto where it is encrypted using the particular quantum key. The encrypted data is then passed to the optical transmitter/receiver 408 for transmission. Message traffic received from the Alice end passes via WDM 402 to the optical transmitter/receiver 408 where it is converted to the electrical domain and sent to all crypto-units 406a-c. The message is encrypted with the quantum key corresponding to one particular user and hence only the intended user's crypto-unit is able to decrypt the message and pass it onto the user.

As an option, the message traffic between a Bob and a particular user could be encrypted using a key that was pre-arranged between the end user and the appropriate part of the Bob or between the end user and the Alice or the remote end user as a method of preventing accidental or intentional misconnections. Whilst this method would not give the advantages of QKD, it would at least make it very difficult to misconnect the Bob equipment to the wrong end user equipment.

Figure 5:
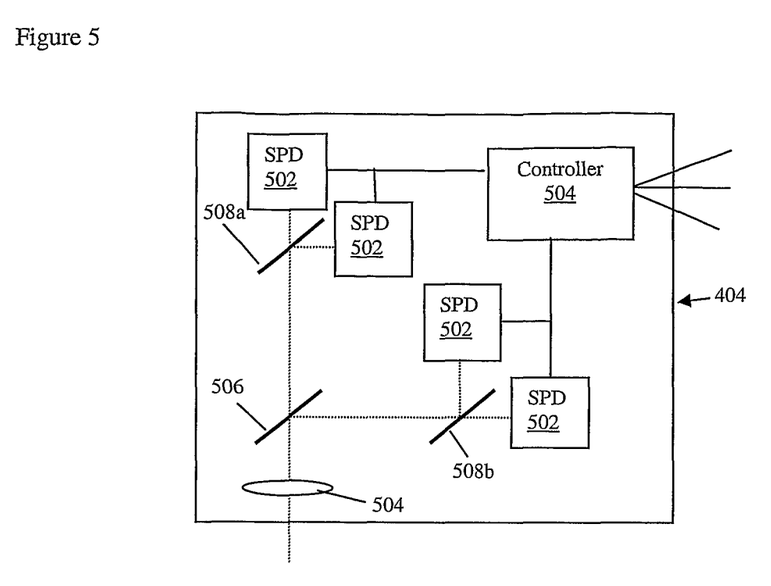
FIG. 5 shows one embodiment of the quantum receiver part of the device of FIG. 4.

FIG. 5 shows one example of a quantum receiver 404 which could be used in the present invention to detect single photons modulated in polarisation according to the BB84 protocol. As the skilled person will appreciate this protocol modulates photons in one of two different polarisation bases, for instance rectilinear and diagonal. In any one basis the values 1 and 0 are encoded by orthogonal polarisation states.

The quantum signal is received by optics 504 which direct the photons onto a nominal 50:50 beamsplitter 506. The beamsplitter will quantum randomly direct the photons to one of two measurement arms. The particular measurement arm determines the basis applied to measure the photon and hence beamsplitter 506 automatically results in a random imposition of measurement basis. In one measurement arm polarising beamsplitter 508a is aligned according to the diagonal basis to direct photons to one or other of the single photon detectors 502. If the particular photon was encoded using the diagonal basis the value, and hence polarisation, will determine which detector the photon is received at. Hence a photon arriving at one detector signifies a data value of 1 and the photon arriving at the other detector signifies a data value of 0. If however the photon was encoded according to the rectilinear basis it will be directed to either of the detectors at random.

The other measurement arm has polarising beamsplitter 508b arranged according to the rectilinear basis. Thus which of the four single photon detectors a photon is detected with inherently gives information regarding the measurement basis applied and data value recorded for that photon.

The single photon detectors are controlled by controller 504 which establishes timing and synchronisation and performs necessary calibration. The controller also combines the detection event from all single photon detectors into a single data string and then transmits said string to each of the logic units.

The invention claimed is:

1. A quantum key device comprising:
   a quantum detector unit comprising one or more quantum signal detectors that detect a quantum signal; and
   a plurality of logic units operably connected to the quantum detector unit, wherein
   an output of the quantum detector unit comprises, for each photon detected in the quantum signal, a measurement basis applied by the quantum detector unit and resulting data value, and
   each of the logic units derives a separate quantum key for each of a plurality of users from the output of the quantum detector units, wherein each logic unit is connected to a classical communication device for communicating with a transmitter device that transmitted the quantum signal.

2. The quantum key device as claimed in claim 1 wherein the quantum key device is arranged so that no signals pass from the logic units to the quantum detector unit but can pass from the quantum detector unit to the logic units.

3. The quantum key device as claimed in claim 1 wherein at least part of the path from the quantum detector unit to the logic units is optical.

4. The quantum key device as claimed in claim 1 wherein the logic units are shielded from one another to prevent any emissions or cross talk between the logic units.

5. The quantum key device as claimed in claim 1 wherein the logic units are one of:
   physically separate units; and
   implemented as separate logical processors within the same processor chip or chip set.

6. The quantum key device as claimed in claim 1 wherein the quantum detector unit comprises a controller for performing at least one of clock timing, synchronisation and calibration.

7. The quantum key device as claimed in claim 1 wherein each logic unit receives only part of the output of the quantum detector unit.

8. The quantum key device as claimed in claim 1 wherein each logic unit receives all of the output of the quantum detector unit.

9. The quantum key device as claimed in claim 8 further comprising a switch which switches the output of the quantum detector unit between the logic units.

10. The quantum key device as claimed in claim 1 wherein the output of the quantum detector unit is passed to each logic unit and each logic unit is arranged to use only part of the output in performing key agreement.

11. The quantum key device as claimed in claim 10 wherein each logic unit uses a different part of the output of the quantum detector unit.

12. The quantum key device as claimed in claim 1 further comprising a separate crypto-unit associated with each logic unit.

13. The quantum key device as claimed in claim 1 further comprising a separate classical channel for said each of plurality of users.

14. The quantum key device as claimed in claim 1 wherein the logic unit is adapted to, in use, obtain the identity key of a current user of said plurality of users connected to the relevant logic unit.

15. The quantum key device as claimed in claim 1 wherein the logic unit is arranged to perform authentication with a user.

16. A quantum detector unit for detecting a quantum signal being arranged to comprising one or more quantum signal detectors which detect a quantum signal, wherein the quantum detector unit produces an output comprising, for each photon detected in the quantum signal, the measurement basis applied by the quantum detector unit and resulting data value, and wherein the quantum detector unit directs the output to at least one logic unit and the at least one logic unit derives a separate quantum key for each of a plurality of users from the output of the quantum detector unit, wherein the at least one logic unit is connected to a classical communication device for communicating with a transmitter device that transmitted the quantum signal.

17. The quantum detector unit as claimed in claim 16 further comprising the at least one logic unit operably connected to a plurality of logically separate crypto-units wherein said logic unit is arranged to derive a separate quantum key for each of said crypto-units.

* * * * *